United States Patent
Lee et al.

(10) Patent No.: US 12,523,675 B2
(45) Date of Patent: Jan. 13, 2026

(54) BATTERY PRODUCTION SYSTEM AND METHOD OF MANAGING THE SAME

(71) Applicant: LG ENERGY SOLUTION, LTD., Seoul (KR)

(72) Inventors: Hu Jun Lee, Daejeon (KR); Sang Hoon Lee, Daejeon (KR); Moon Koo Chung, Daejeon (KR); Jung Hoon Lee, Daejeon (KR); Jung Hyun Kwon, Daejeon (KR); Duk You Kim, Daejeon (KR); Seok Hyeong Ham, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 406 days.

(21) Appl. No.: 18/270,950

(22) PCT Filed: Aug. 9, 2022

(86) PCT No.: PCT/KR2022/011841
§ 371 (c)(1),
(2) Date: Jul. 5, 2023

(87) PCT Pub. No.: WO2023/038305
PCT Pub. Date: Mar. 16, 2023

(65) Prior Publication Data
US 2024/0053376 A1    Feb. 15, 2024

(30) Foreign Application Priority Data

Sep. 8, 2021    (KR) .......................... 10-2021-0120044

(51) Int. Cl.
*G01P 15/00*    (2006.01)
*G01S 13/74*    (2006.01)

(52) U.S. Cl.
CPC .............. *G01P 15/00* (2013.01); *G01S 13/74* (2013.01)

(58) Field of Classification Search
CPC ...... G01P 15/00; G01P 15/0891; G01S 13/74; H01M 2010/4278; H01M 50/20;
(Continued)

(56) References Cited

U.S. PATENT DOCUMENTS 5,701,257 A     12/1997  Miura et al.
10,338,148 B2 *  7/2019  Sakabe .................... H04Q 9/00
(Continued)

FOREIGN PATENT DOCUMENTS

CN       113013508 A    6/2021
EP       4 317 034 A1   2/2024
(Continued)

OTHER PUBLICATIONS

Extended European Search Report for European Application No. 22867574.0, dated May 2, 2024.
(Continued)

*Primary Examiner* — Manuel A Rivera Vargas
(74) *Attorney, Agent, or Firm* — Birch, Stewart, Kolasch & Birch, LLP

(57) ABSTRACT

Discussed is a battery production system that may include a tray configured to carry a battery, a plurality of collectors configured to perform wireless communication with the tray, and a server configured to track a position of the tray and whether or not an impact occurs in the tray based on information received from the plurality of collectors, in which the tray includes a measurement unit configured to sense an impact and a communication unit configured to perform wireless communication with the plurality of collectors. The measurement unit is further configured to reduce a measurement interval at a designated first rate upon
(Continued)

sensing the impact, and the communication unit is configured to reduce an interval of the wireless communication with the plurality of collectors at a designated second rate upon sensing the impact.

14 Claims, 7 Drawing Sheets

(58) Field of Classification Search
CPC ...... Y02P 70/50; G01L 5/0052; H04W 4/029; H04W 4/023; H04W 4/38; G06Q 10/08; G06Q 50/04; Y02E 60/10
See application file for complete search history.

(56) References Cited

U.S. PATENT DOCUMENTS

| | | | |
|---|---|---|---|
| 2013/0130068 A1 | 5/2013 | Song et al. | |
| 2020/0346874 A1 | 11/2020 | Onishi et al. | |
| 2023/0010305 A1* | 1/2023 | Lee | H01M 50/298 |
| 2023/0416010 A1* | 12/2023 | Kim | B65G 43/08 |

FOREIGN PATENT DOCUMENTS

| | | |
|---|---|---|
| JP | 2810633 B2 | 10/1998 |
| JP | 2012-236690 A | 12/2012 |
| JP | 2018-132440 A | 8/2018 |
| JP | 2019-152563 A | 9/2019 |
| JP | 2020-71629 A | 5/2020 |
| KR | 20-0418790 Y1 | 6/2006 |
| KR | 10-0719280 B1 | 5/2007 |
| KR | 10-1201335 B1 | 11/2012 |
| KR | 10-1203890 B1 | 11/2012 |
| KR | 10-2019-0006824 A | 1/2019 |
| KR | 10-2044931 B1 | 11/2019 |
| KR | 10-2020-0030818 A | 3/2020 |
| KR | 10-2020-0089448 A | 7/2020 |
| KR | 10-2178501 B1 | 11/2020 |
| WO | WO 2020/044754 A1 | 3/2020 |

OTHER PUBLICATIONS

International Search Report (PCT/ISA/210) issued in PCT/KR2022/011841, dated Nov. 15, 2022.

* cited by examiner

BATTERY PRODUCTION SYSTEM AND METHOD OF MANAGING THE SAME

CROSS-REFERENCE TO RELATED APPLICATION

This application claims priority to and the benefit of Korean Patent Application No. 10-2021-0120044 filed in the Korean Intellectual Property Office on Sep. 8, 2021, the entire contents of which are incorporated herein by reference.

TECHNICAL FIELD

Embodiments disclosed herein relate to a battery production system and management thereof.

BACKGROUND ART

Recently, research and development of secondary batteries have been actively performed. Herein, the secondary batteries, which are chargeable/dischargeable batteries, may include all of conventional nickel (Ni)/cadmium (Cd) batteries, Ni/metal hydride (MH) batteries, etc., and recent lithium-ion batteries. Among the secondary batteries, a lithium-ion battery has a much higher energy density than those of the conventional Ni/Cd batteries, Ni/MH batteries, etc. Moreover, the lithium-ion battery may be manufactured to be small and lightweight, such that the lithium-ion battery has been used as a power source of mobile devices. In addition, the lithium ion battery is attracting attention as a next-generation energy storage medium as a usage range thereof is expanded to a power source of electric vehicles.

DISCLOSURE

Technical Problem

In a battery production system, a battery is moved through a conveyor belt while being carried on a tray, and may be damaged for various reasons in a logistics movement process. For example, when logistics are congested in a specific section of the conveyor belt, cracks may occur due to collisions between logistics, leading to deterioration of battery product quality. Thus, proactive or follow-up management of product quality deterioration occurring in logistics movement in a battery production system is required.

Technical problems of the embodiments disclosed herein are not limited to the above-described technical problems, and other unmentioned technical problems would be clearly understood by one of ordinary skill in the art from the following description.

Technical Solution

A battery production system disclosed herein includes a tray configured to carry a battery, a plurality of collectors configured to perform wireless communication with the tray, and a server configured to track a position of the tray and whether or not an impact occurs in the tray based on information received from the plurality of collectors, in which the tray includes a measurement unit configured to sense an impact and a communication unit configured to perform wireless communication with the plurality of collectors, the measurement unit is further configured to reduce a measurement interval at a designated first rate upon sensing the impact, and the communication unit is configured to reduce an interval of the wireless communication with the plurality of collectors at a designated second rate upon sensing the impact.

An operating method of a battery production system disclosed herein includes operations of sensing, by a tray, whether an impact occurs at designated measurement intervals, performing, by the tray, wireless communication with a plurality of collectors, upon sensing the impact, reducing, by the tray, a measurement interval at a designated first rate and reducing an interval of the wireless communication with the plurality of collectors at a designated second rate, transmitting, by the plurality of collectors, a result of the wireless communication with the tray to a server, and determining, by the server, a position of the tray and whether or not an impact occurs in the tray based on information received from the plurality of collectors.

Advantageous Effects

A battery production system according to an embodiment disclosed herein may check in advance factors of battery product quality deterioration occurring in logistics movement by tracking in real time a position and impact occurrence of a tray.

The battery production system according to an embodiment disclosed herein may manage a congestion section and minimize a loss by monitoring in real time logistics movement of a battery.

The battery production system according to an embodiment disclosed herein may more precisely track data related to a battery suspected of being defective in a monitoring process.

The battery management apparatus according to an embodiment disclosed herein may reduce a cost for detecting and managing a low-performance battery.

MODE FOR INVENTION

Figure 1:
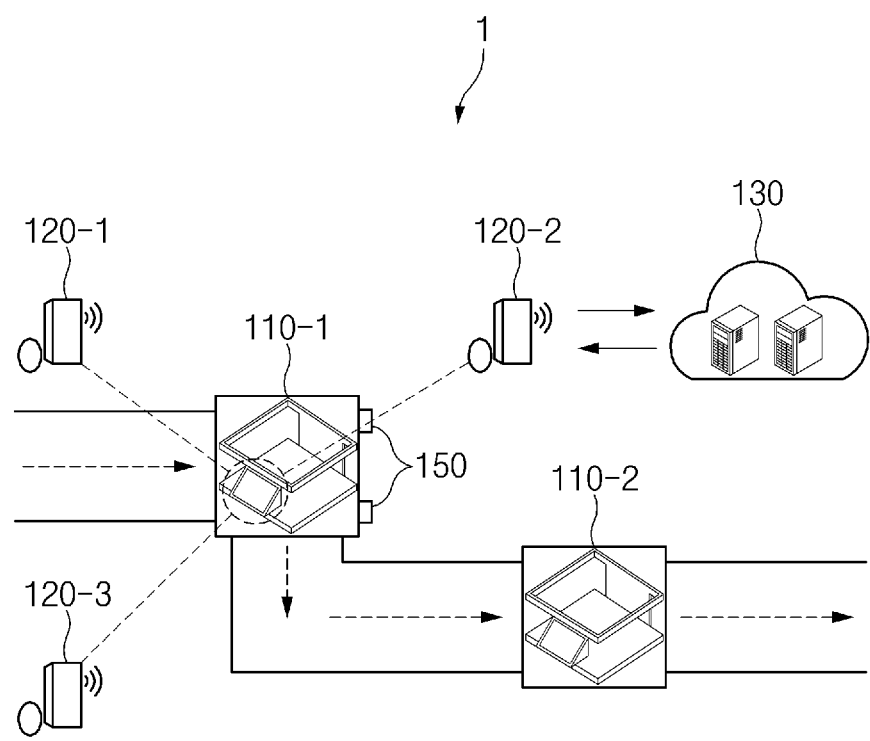
FIG. 1 illustrates a battery production system according to various embodiments.

Hereinafter, various embodiments disclosed herein will be described in detail with reference to the accompanying drawings. In this document, identical reference numerals will be used for identical components in the drawings, and the identical components will not be redundantly described.

For various embodiments disclosed herein, specific structural or functional descriptions are only exemplified for the purpose of describing the embodiments, and various embodiments disclosed herein may be implemented in various forms, and should not be construed as being limited to the embodiments described herein.

As used in various embodiments, the terms "1st, "2nd", "first". "second", or the like may modify various components regardless of importance, and do not limit the components. For example, a first component may be named as a second component without departing from the right scope of an embodiment disclosed herein, and similarly, the second component may be named as the first component.

Terms used in the present document are used for only describing a specific exemplary embodiment of the disclosure and may not have an intention to limit the scope of other exemplary embodiments of the disclosure. It is to be understood that the singular forms include plural references unless the context clearly dictates otherwise.

All terms including technical and scientific terms used herein have the same meaning as commonly understood by one of ordinary skill in the art to which the embodiments disclosed herein belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments disclosed herein.

FIG. 1 illustrates a battery production system according to various embodiments.

Referring to FIG. 1, a battery production system 1 may include at least one trays 110-1 and 110-2, a plurality of collectors 120-1, 120-2, and 120-3, and a server 130.

The trays 110-1 and 110-2 may move along a conveyor belt while containing a battery. When the tray 110-1 including the battery collides with a stopper 150 of the conveyor belt or collision occurs between the trays 110-1 and 110-2 due to logistics congestion, the quality and performance of the battery may be deteriorated due to a crack occurring in the battery (or a pouch including the battery), such that positions and impact occurrence of the trays 110-1 and 110-2 need to be monitored in real time.

The plurality of collectors 120-1, 120-2, and 120-3 may be disposed at a distance spaced from each conveyor belt and may wirelessly transmit and receive a signal to and from the trays 110-1 and 110-2. Each of the plurality of collectors 120-1, 120-2, and 120-3 may measure distances to the trays 110-1 and 110-2 through wireless communication with the trays 110-1 and 110-2, and may receive information related to impact (e.g., impact amount information) from the trays 110-1 and 110-2. In this case, a wireless communication method between the plurality of collectors 120-1, 120-2, and 120-3 and the trays 110-1 and 110-2 may vary, and for example, to improve positioning accuracy, an ultra wide band (UWB) signal may be used.

The server 130 may be configured to monitor in real time the positions and impact occurrence of the trays 110-1 and 110-2 based on information received from the plurality of collectors 120-1, 120-2, and 120-3, and to accumulate and use the monitored data. For example, the server 130 may calculate the position of the tray 110-1 by using various positioning methods for a distance of each of the plurality of collectors 120-1, 120-2, and 120-3 to the tray 110-1. The positioning method may include, for example, a triangulation method. The server 130 may determine whether impact occurs in the tray 110-1, based on the impact amount information of the tray 110-1 received from the plurality of collectors 120-1, 120-2, and 120-3. The server 130 may accumulate data related to impact occurrence (e.g., position, time, and frequency of impact occurrence, etc.) to allow a user to recognize a reason for impact occurrence and to cure the same, and output a notification immediately upon determining that the impact occurs, to allow the user to quickly detect a defective battery occurring in a logistics movement process. Alternatively, when sensing impact occurrence in the tray 110, the server 130 may notify the user of a battery suspected of being defective by using a designated method (e.g., lighting or alarm) when the tray 110 reaches a final point of the conveyor belt.

Figure 2:
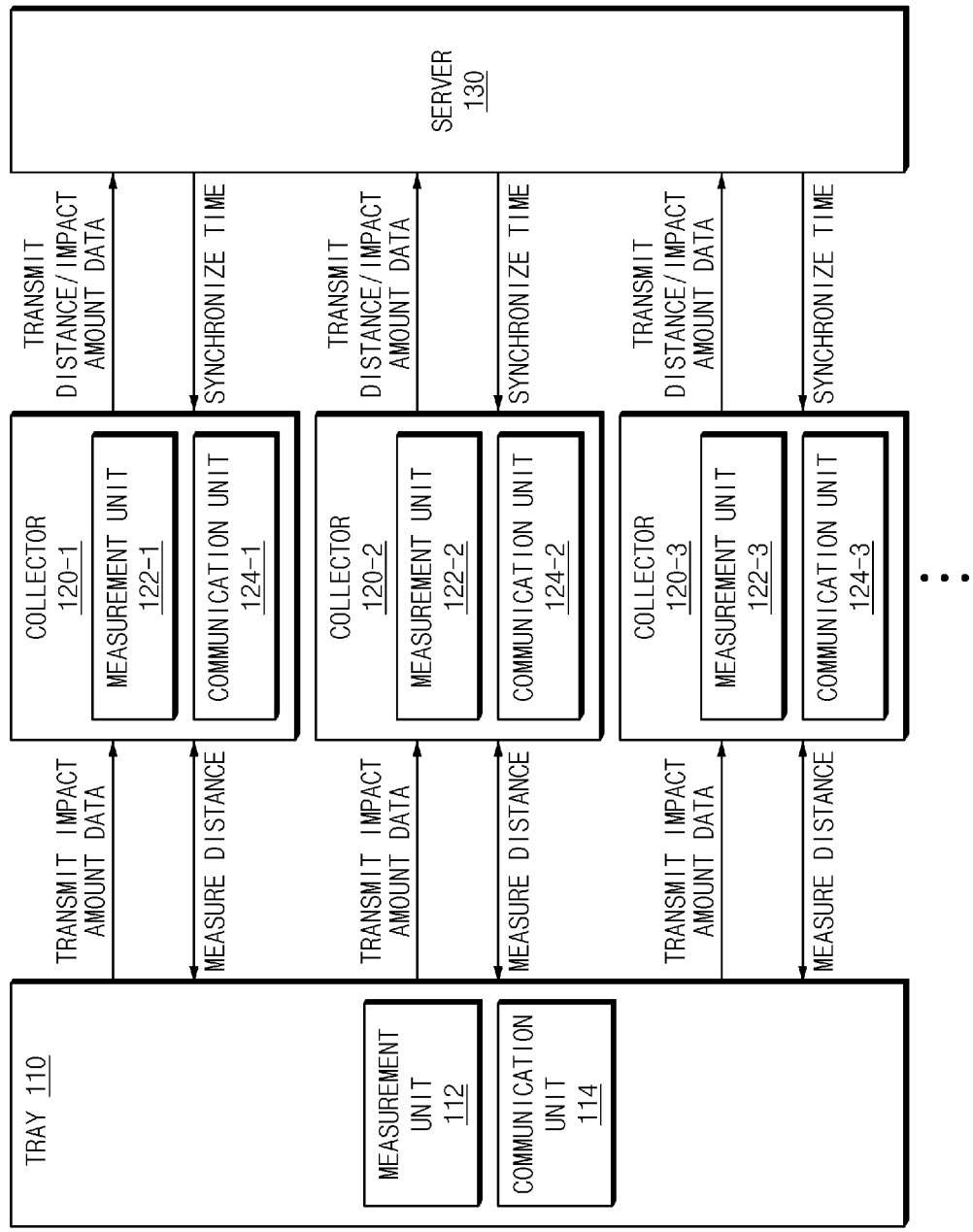
FIG. 2 is a block diagram of a battery production system according to various embodiments.

FIG. 2 is a block diagram of a battery production system according to various embodiments.

Referring to FIG. 2, the tray 110 may include a measurement unit 112 and a communication unit 114. Although not shown in FIG. 2, the tray 110 may further include a power source unit (e.g., a battery) that supplies power to implement the measurement unit 112 and the communication unit 114. The measurement unit 112 may be configured to obtain data for calculating the amount of impact occurring during movement of the tray 110. The 'measurement unit' may also be referred to as a 'measurement device', a 'measurement module', a 'measurement circuit', or a 'sensor'. For example, the measurement unit 112 may include at least one of an acceleration sensor or a gyro sensor (an angular velocity sensor). The acceleration sensor may sense an acceleration in x, y, and z axes, and the gyro sensor may sense an angular velocity. The communication unit 114 may be configured to perform wireless communication with the plurality of collectors 120-1, 120-2, and 120-3. The 'communication unit' may also be referred to as a 'communication device', a 'communication module', a 'communication circuit', or a 'modem'. For example, the communication unit 114 may support a UWB communication protocol, without being limited thereto.

Due to the finitude of power supplied to the measurement unit 112 and the communication unit 114, each of the measurement unit 112 and the communication unit 114 may perform an operation at designated intervals. For example, the measurement unit 112 may measure an acceleration or an angular velocity at designated measurement intervals, and the communication unit 114 may transmit a signal to the collectors 120-1, 120-2, and 120-3 at designated communication intervals. When impact is sensed in the tray 110 according to embodiments, the tray 110 may adjust a measurement interval of the measurement unit 112 and a communication interval and a signal strength of the communication unit 114 to improve the precision of impact amount calculation and accurately provide a position of the tray 110. A detailed embodiment related to adjustment of the measurement interval, the communication interval, and the signal strength will be described with reference to FIGS. 3 to 5.

The plurality of collectors 120-1, 120-2, and 120-3 may respectively include measurement units 122-1, 122-2, and 122-3, and communication units 124-1, 124-2, and 124-3. The plurality of collectors 120-1, 120-2, and 120-3 may further include a power source unit (e.g., a battery) that supplies power to implement the measurement units 122-1, 122-2, and 122-3, and the communication units 124-1, 124-2, and 124-3. The communication units 124-1, 124-2, and 124-3 may be configured to perform wireless communication (e.g., UWB) with the communication unit 114 of the tray 110. The measurement units 122-1, 122-2, and 122-3 may calculate a distance to the tray 110 based on a wireless communication result. For example, the communication unit 124-1 of the collector 120-1 may transmit a signal to the communication unit 114 of the tray 110 and the receive a signal from the communication unit 114. The measurement unit 122-1 of the collector 120-1 may calculate a distance between the collector 120-1 and the tray 110 by using a round-trip time of a signal. The communication unit 124-1 of the collector 120-1 may receive data related to an impact time (e.g., an acceleration and an angular velocity) from the tray 110 through a signal for distance measurement or a signal that is separate from the signal. The communication units 124-1, 124-2, and 124-3 of the plurality of collectors 120-1, 120-2, and 120-3 may transmit information related to the tray 110, e.g., at least one of distance information and impact amount information to the server 130.

The server 130 may track in real time the positions and impact occurrence of the tray 110-1 based on information received from the plurality of collectors 120-1, 120-2, and 120-3. According to an embodiment, the server 130 may transmit a signal for time synchronization to the plurality of collectors 120-1, 120-2, and 120-3 at designated intervals to improve the accuracy of position calculation based on a triangulation method.

Figure 3:
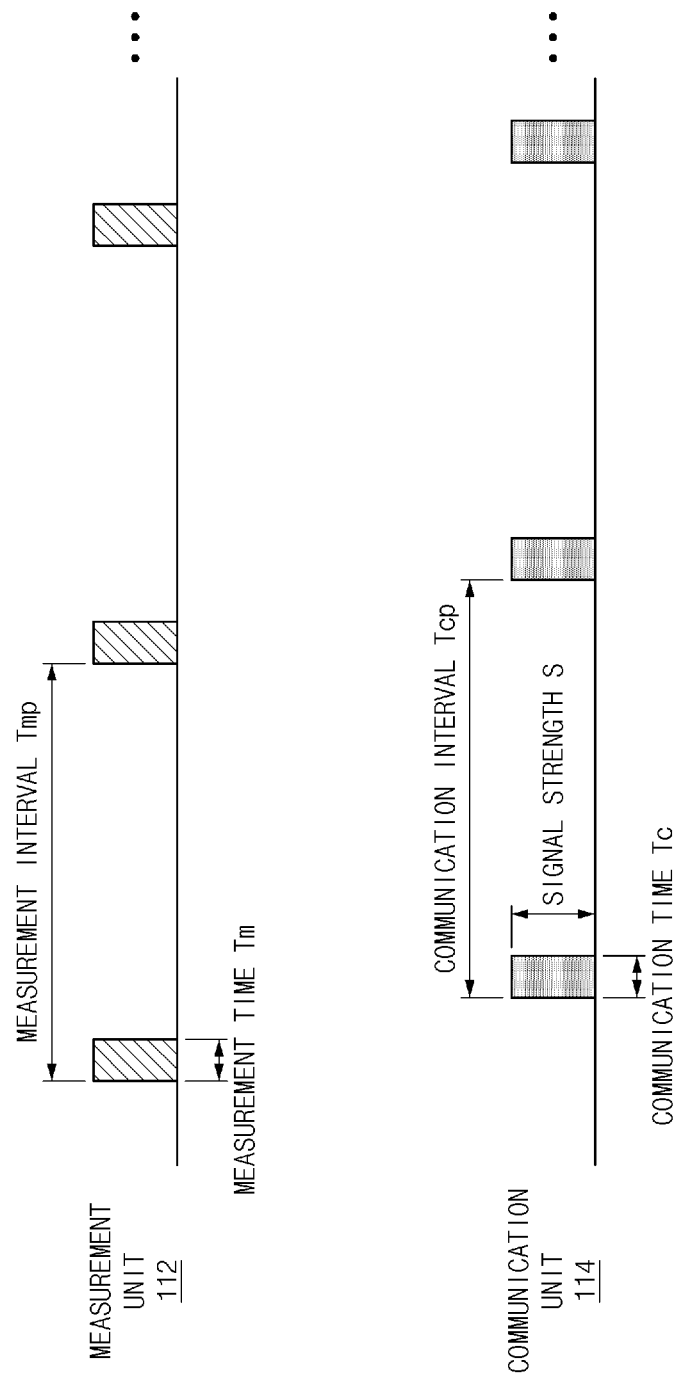
FIG. 3 illustrates a measurement interval and a communication interval according to various embodiments.
Figure 4:
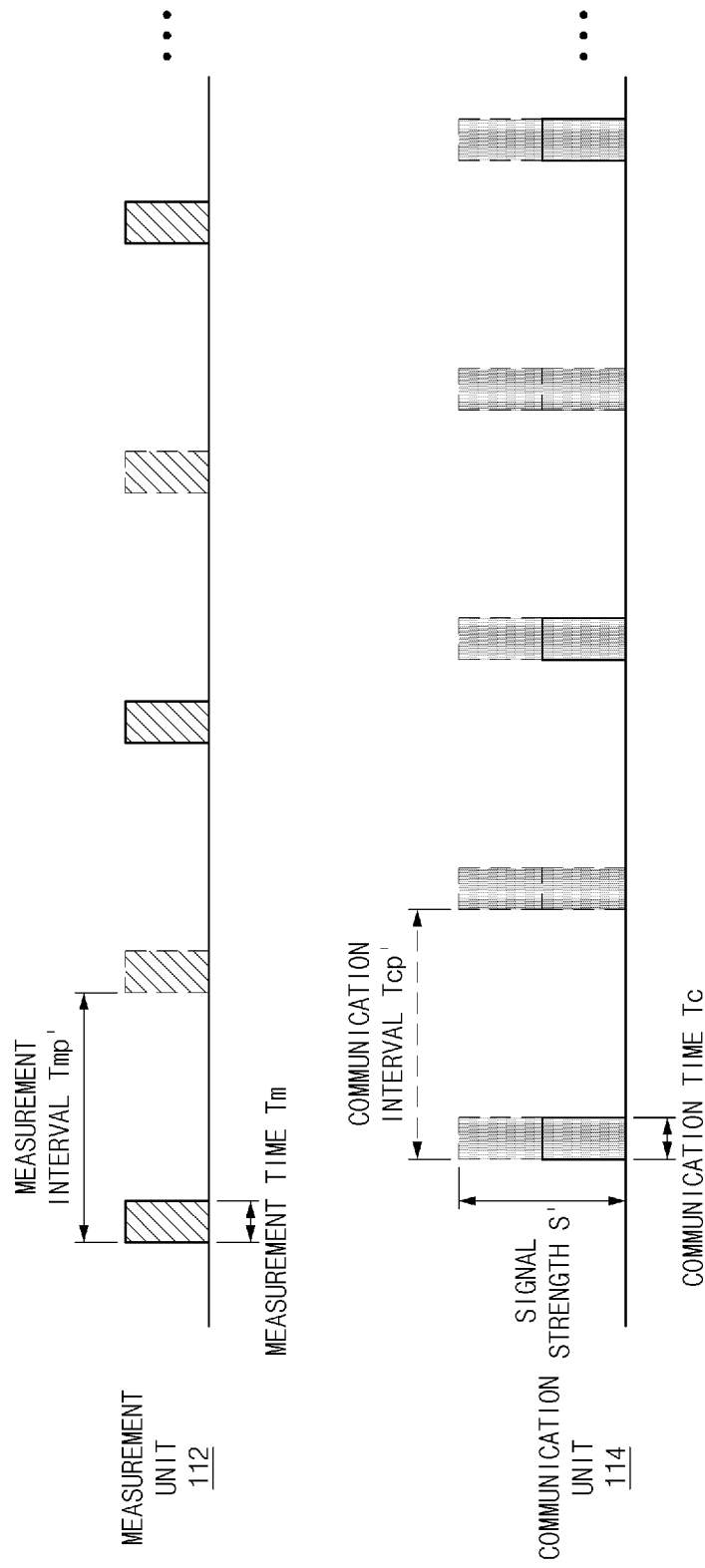
FIG. 4 illustrates a measurement interval and a communication interval according to various embodiments.
Figure 5:
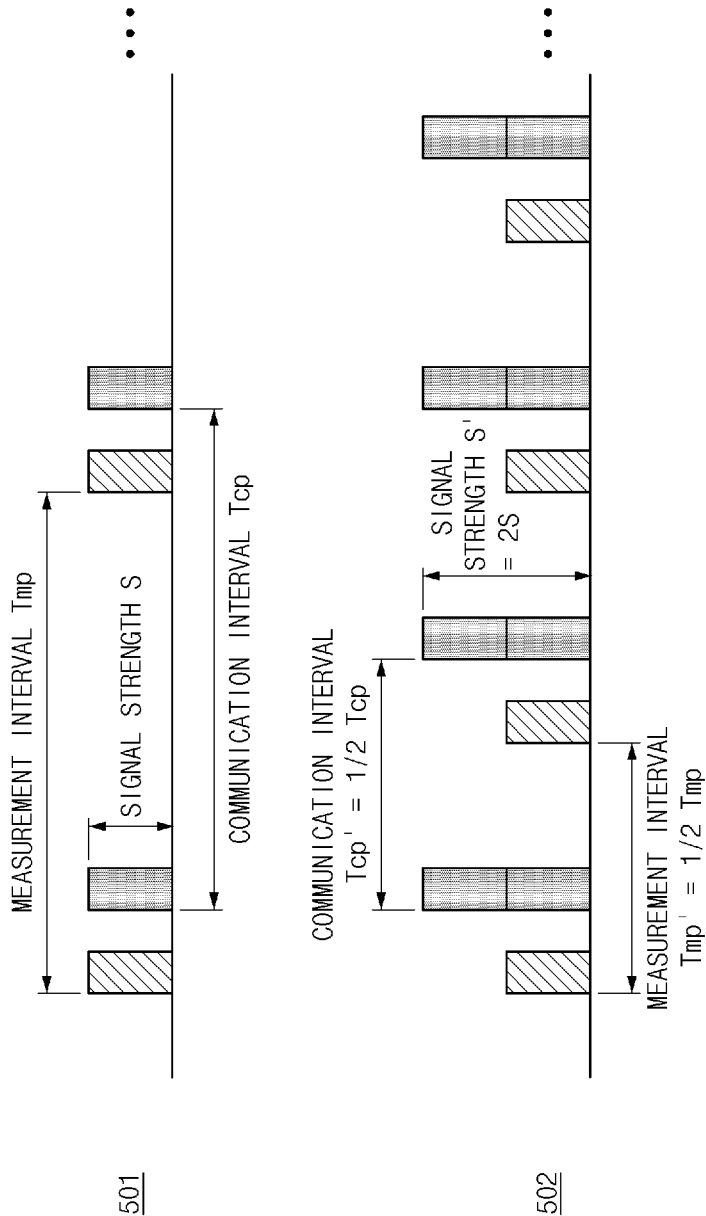
FIG. 5 illustrates a measurement interval and a communication interval according to various embodiments.

FIGS. 3 through 5 illustrate a measurement interval and a communication interval according to various embodiments.

FIG. 3 shows a measurement interval and a communication interval before sensing of impact in the tray 110, and FIG. 4 shows a measurement interval and a communication interval after sensing of impact in the tray 110. In each drawing, a horizontal axis indicates time.

Referring to FIG. 3, the measurement unit 112 may perform measurement for impact sensing at designated measurement intervals Tmp and in a designated measurement time Tm. The communication unit 114 may perform wireless communication with a collector at designated communication intervals Tcp and in a designated communication time Tc. For example, when data related to impact is generated by the measurement unit 112, the communication unit 114 may transmit data received from the measurement unit 112 to at least one collector (e.g., 120-1). The communication unit 114 may transmit a signal at a designated signal strength S. A signal for distance measurement and a signal for impact data transmission may be identical or separate signals.

Referring to FIG. 4, the tray 110 may change a measurement interval of the measurement unit 112 and a communication interval 114 of the communication unit 114 in response to sensing of impact. For example, when data (e.g., an acceleration or an angular velocity) measured in a previous measurement time exceeds a threshold value, the measurement unit 112 may perform measurement at measurement intervals Tmp' reduced at a designated first rate from the measurement intervals Tmp to improve measurement accuracy. The communication unit 114 may also perform wireless communication at communication intervals Tcp' reduced at a designated second rate from the communication intervals Tcp based on data (i.e., an acceleration or an angular velocity exceeding the threshold value) received from the measurement unit 112 to more frequently transmit the data to the collector 120-1. The second rate may be equal to or different from the first rate. As the number of pieces of the data received from the tray 110 increases, the collector 120-1 may more precisely measure a distance between the tray 110 and the collector 120-1. Although not shown in FIG. 4, when it is determined that the impact amount data received from the tray 110 exceeds the threshold value, the collector 120-1 may reduce the communication intervals of the communication unit 124-1 to more frequently transmit the impact amount data of the tray 110 to the server 130.

According to an embodiment, the communication unit 114 may increase a signal strength at a designated third rate. The third rate may be equal to or different from the first rate or the second rate. The collector 120-1 may sense occurrence of impact in the tray 110 by receiving a signal of an increased strength even though failing to receive separate impact amount data. Moreover, when the signal strength increases, not only the collector 120-1, but also the server 130 located farther than the collector 120-1 may also receive the signal of the communication unit 114, such that the server 130 may quickly sense occurrence of impact.

FIG. 5 shows an example where a measurement interval, a communication interval, and a signal strength are controlled. For example, a first graph 501 indicates a value before impact is sensed in the tray 110, and a second graph 502 indicates a value after impact is sensed in the tray 110. When impact is sensed in the tray 110, the measurement unit 112 may reduce a measurement interval to ½ and the communication unit 114 may reduce a communication interval to ½. The communication unit 114 may double (S') a signal strength S.

Figure 6:
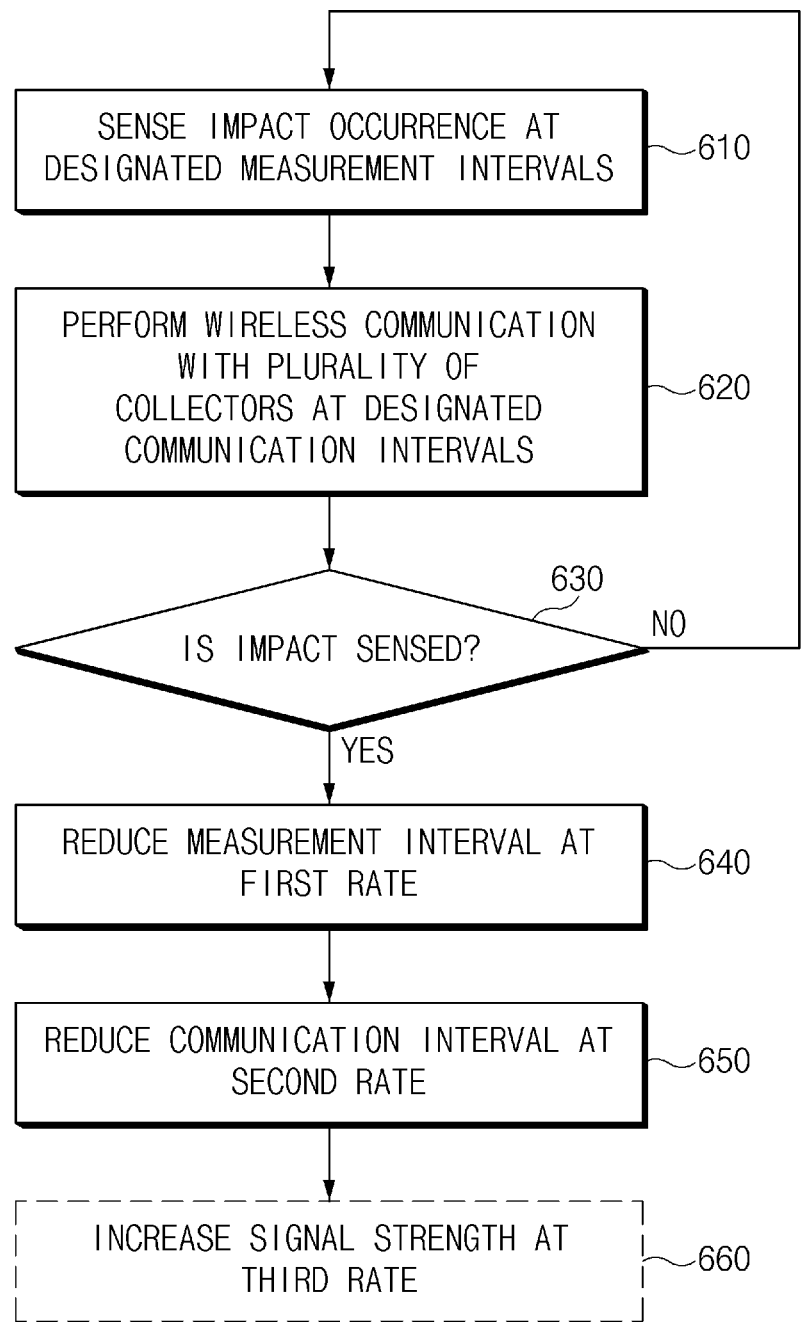
FIG. 6 is an operating flowchart of a tray to control a measurement interval and a communication interval, according to various embodiments.

FIG. 6 is an operating flowchart of a tray to control a measurement interval and a communication interval, according to various embodiments.

Referring to FIG. 6, in operation 610, the measurement unit 112 of the tray 110 may sense occurrence of impact at designated measurement intervals. For example, the measurement unit 112 may measure an acceleration or an angular velocity.

In operation 620, the communication unit 114 of the tray 110 may perform wireless communication with the plurality of collectors 120-1, 120-2, and 120-3 at designated communication intervals.

In operation 630, the measurement unit 112 may sense impact in the tray 110. For example, the measurement unit 112 may determine that the impact occurs when the measured acceleration or angular velocity exceeds a threshold value. When the measured data does not exceed the threshold value, the measurement unit 112 and the communication unit 114 may repeat operations 610 and 620.

When the impact is sensed, the measurement unit 112 may reduce a measurement interval at a designated first rate in operation 640. In operation 650, the communication unit 114 may reduce a communication interval at a designated second rate.

According to an embodiment, the communication unit 114 may further perform operation 660. More specifically, the communication unit 114 may increase a signal strength at a designated third rate.

Figure 7:
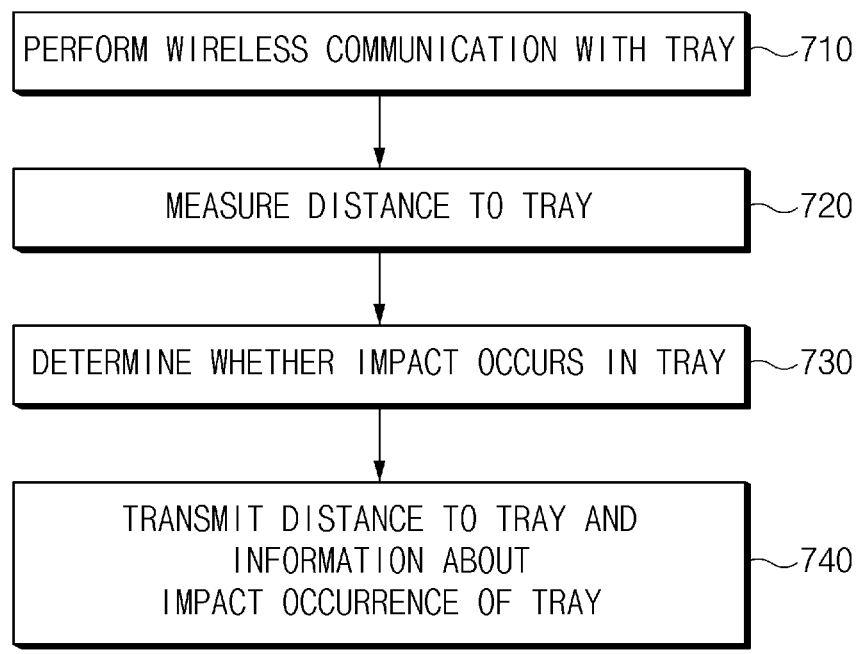
FIG. 7 is an operating flowchart of a collector to transmit information about a tray, according to various embodiments.

FIG. 7 is an operating flowchart of a collector to transmit information about a tray, according to various embodiments.

Referring to FIG. 7, in operation 710, a collector (e.g., 120-1) may perform wireless communication with the tray 110.

In operation 720, the collector 120-1 may measure a distance to the tray 110 based on a wireless communication result. For example, the collector 120-1 may measure the distance by using round-trip times of a transmission signal and a received signal.

In operation 730, the collector 120-1 may determine whether impact occurs in the tray 110. For example, the collector 120-1 may determine that the impact occurs in the tray 110 when data (e.g., an acceleration or an angular velocity) received from the tray 110 exceeds a threshold value or a strength of a signal received from the tray 110 exceeds a threshold value.

In operation 740, the collector 120-1 may transmit the distance to the tray 110 and information about occurrence of impact of the tray 110 to the server 130.

Even though all components constituting an embodiment disclosed herein have been described above as being combined into one or operating in combination, the embodiments disclosed herein are not necessarily limited to the embodiments. That is, within the object scope of the embodiments disclosed herein, all the components may operate by being selectively combined into one or more.

Moreover, terms such as "include", "constitute" or "have" described above may mean that the corresponding component may be inherent unless otherwise stated, and thus should be construed as further including other components rather than excluding other components. All terms including technical or scientific terms have the same meanings as those generally understood by those of ordinary skill in the art to which the embodiments disclosed herein pertain, unless defined otherwise. The terms used generally like terms defined in dictionaries should be interpreted as having meanings that are the same as the contextual meanings of the relevant technology and should not be interpreted as having ideal or excessively formal meanings unless they are clearly defined in the present document.

The above description is merely illustrative of the technical idea of the present disclosure, and various modifications and variations will be possible without departing from the essential characteristics of embodiments of the present disclosure by those of ordinary skill in the art to which the embodiments disclosed herein pertains. Therefore, the embodiments disclosed herein are intended for description rather than limitation of the technical spirit of the embodiments disclosed herein and the scope of the technical spirit of the present disclosure is not limited by these embodiments disclosed herein. The protection scope of the technical spirit disclosed herein should be interpreted by the following claims, and all technical spirits within the same range should be understood to be included in the range of the present document.

The invention claimed is:

1. A battery production system comprising:
   a tray configured to carry a battery;
   a plurality of collectors configured to perform wireless communication with the tray; and
   a server configured to track a position of the tray and whether or not an impact occurs in the tray based on information received from the plurality of collectors,
   wherein the tray comprises a measurement unit configured to sense an impact and a communication unit configured to perform wireless communication with the plurality of collectors,
   the measurement unit is further configured to reduce a measurement interval at a designated first rate upon sensing the impact, and
   the communication unit is configured to reduce an interval of the wireless communication with the plurality of collectors at a designated second rate upon sensing the impact.

2. The battery production system of claim 1, wherein the measurement unit comprises at least one of an acceleration sensor or a gyro sensor, and
   wherein the communication unit is further configured to transmit impact amount information measured by the measurement unit to the plurality of collectors.

3. The battery production system of claim 2, wherein the plurality of collectors are configured to transmit a measured distance to the tray and the measured impact amount information to the server through wireless communication with the server.

4. The battery production system of claim 2, wherein the plurality of collectors are configured to determine a distance to the tray based on transmission and reception times of an ultra wide band (UWB) signal used between the tray and the plurality of collectors.

5. The battery production system of claim 3, wherein the server is further configured to determine the position and the impact occurrence of the tray based on the information received from the plurality of collectors.

6. The battery production system of claim 5, wherein the server is further configured to calculate the position of the tray by using a distance between the plurality of collectors and the tray and a triangulation method.

7. The battery production system of claim 1, wherein the communication unit is further configured to increase a strength of a signal for the wireless communication with the plurality of collectors at a designated third rate upon sensing the impact.

8. The battery production system of claim 7, wherein the plurality of collectors are further configured to determine that the impact occurs in the tray, upon receiving the signal of the increased strength from the tray.

9. The battery production system of claim 7, wherein the server is further configured to determine that the impact occurs in the tray, upon receiving a signal of an increased strength from the tray.

10. An operating method of a battery production system, the operating method comprising operations of:
    sensing, by a tray, whether an impact occurs at designated measurement intervals;
    performing, by the tray, wireless communication with a plurality of collectors;
    upon sensing the impact, reducing, by the tray, a measurement interval at a designated first rate and reducing an interval of the wireless communication with the plurality of collectors at a designated second rate;
    transmitting, by the plurality of collectors, a result of the wireless communication with the tray to a server; and
    determining, by the server, a position of the tray and whether or not an impact occurs in the tray based on information received from the plurality of collectors.

11. The operating method of claim 10, wherein the operation of transmitting, by the plurality of collectors, the result of the wireless communication with the tray to the server comprises an operation of transmitting a distance to the tray, which is measured based on times of transmission and reception of an ultra wide band (UWB) signal and impact amount information of the tray to the server.

12. The operating method of claim 11, wherein the operation of determining, by the server, the position of the tray comprises an operation of determining the position of the tray by using a distance between the plurality of collectors and the tray and a triangulation method.

13. The operating method of claim 10, further comprising an operation of increasing a strength of a signal for the wireless communication with the plurality of collectors at a designated third rate upon sensing the impact.

14. The operating method of claim 13, further comprising an operation of determining, by the plurality of collectors or the server, that the impact occurs in the tray, upon receiving the signal of the increased strength from the tray.

* * * * *